United States Patent [19]

Watson et al.

[11] Patent Number: 5,829,407

[45] Date of Patent: *Nov. 3, 1998

[54] INTERNAL COMBUSTION ENGINES

[75] Inventors: Stephen James Watson, Trigg; Darren Andrew Smith, Balgowlah; Robert Walter Frew, Scarborough, all of Australia

[73] Assignee: Orbital Engine Company (Australia) Pty Limited, Balcatta, Australia

[*] Notice: This patent issued on a continued prosecution application filed under 37 CFR 1.53(d), and is subject to the twenty year patent term provisions of 35 U.S.C. 154(a)(2).

[21] Appl. No.: 875,355

[22] PCT Filed: Feb. 16, 1996

[86] PCT No.: PCT/AU96/00078

§ 371 Date: Jul. 30, 1997

§ 102(e) Date: Jul. 30, 1997

[87] PCT Pub. No.: WO96/25592

PCT Pub. Date: Aug. 22, 1996

[30] Foreign Application Priority Data

Feb. 16, 1995 [AU] Australia ................................ PN 1186

[51] Int. Cl.⁶ .................................................. F02M 19/00
[52] U.S. Cl. ............................................................ 123/275
[58] Field of Search ...................................... 123/275, 256, 123/297, 299, 531

[56] References Cited

U.S. PATENT DOCUMENTS

| | | | |
|---|---|---|---|
| 4,765,293 | 8/1988 | Gonzalez | 123/275 |
| 4,800,862 | 1/1989 | McKay et al. | 123/531 |
| 4,924,828 | 5/1990 | Oppenheim | 123/299 |
| 4,926,818 | 5/1990 | Oppenheim et al. | 123/297 |
| 5,060,610 | 10/1991 | Paro | 123/300 |
| 5,115,776 | 5/1992 | Ohno et al. | 123/299 |
| 5,271,365 | 12/1993 | Oppenheim et al. | 123/256 |
| 5,555,868 | 9/1996 | Neumann | 123/275 |

FOREIGN PATENT DOCUMENTS

| | | | |
|---|---|---|---|
| 150409 | 10/1979 | Taiwan | 123/275 |
| 1 439 714 | 6/1976 | United Kingdom | 123/275 |
| 2 271 808 | 4/1994 | United Kingdom | 123/275 |

OTHER PUBLICATIONS

Patent Abstracts of Japan, M1679, p. 80, JP 6–173823 A (Unisia Jecs Corp), Jun. 21, 1994.

Patent Abstracts of Japan, M1513, p. 27, JP 5–195787 A (Yamaha Motor Co Ltd), Aug. 3, 1993.

*Primary Examiner*—Raymond A. Nelli
*Attorney, Agent, or Firm*—Nikaido, Marmelstein, Murray & Oram LLP

[57] ABSTRACT

Disclosed is an internal combustion engine (20) having a combustion chamber (36), a pre-combustion chamber (38) communicating with the combustion chamber (36), injection means (70) located and arranged to periodically deliver controlled amounts of fuel and air into the pre-combustion chamber (38) in a manner and orientation to direct a fuel spray to pass through the pre-combustion chamber (38) into the combustion chamber (36), and ignition means (63) positioned relative to the pre-combustion chamber (38) and operably arranged to ignite the fuel spray.

73 Claims, 5 Drawing Sheets

INTERNAL COMBUSTION ENGINES

This invention relates to the combustion process of an internal combustion engine and particularly to the enhancement of that process to reduce the level of exhaust emissions, improve the fuel consumption and/or improve combustion stability and/or otherwise enhance the combustion process. More particularly, the invention relates to internal combustion engines wherein fuel is directly injected into the cylinders of the engine.

All major industrial countries currently have regulations relating to the level of exhaust emissions from motor vehicles, particularly passenger type vehicles. The controlling authorities are generally progressively reducing the permitted level of emissions that such vehicles may emit thereby increasing the demand for greater control of the combustion process of internal combustion engines. The regulations regarding the control of exhaust emissions generally provide for a test procedure wherein engine operation at low to medium load is typically a significant factor and unfortunately these areas of operation of the engine generally present a substantial difficulty in control of the combustion process.

It has been recognised that in the low to medium load range of operation of an engine, the distribution of fuel within the air charge in the engine combustion chamber is preferably of a stratified nature in order to provide improved fuel consumption. The creation of such a stratified fuel distribution is particularly difficult to achieve where the fuel is introduced into the air charge prior to the air charge entering the combustion chamber. This is particularly so as the fuel must be delivered into the air charge at a specific time related to the engine cycle which will ensure that all of the fuel reaches the combustion chamber before the inlet port associated therewith is closed. Thus there is a substantial time interval for the fuel to disperse in the air charge, both in the air intake system and in the combustion chamber, before and after closing of the inlet port; and prior to ignition of the air/fuel mixture.

Some degree of success has been achieved in establishing a stratified fuel distribution by the use of a fuel injector to deliver the fuel into the air charge at a location only a relatively short distance upstream from the inlet port. This permits relatively late injection of the fuel and restricts the time available for dispersion of the fuel within the air charge prior to ignition. Further improvement has been obtained by the injection of pressurised fuel directly into the combustion chamber. However, this introduces the further problem that the fuel must be injected at a near sonic velocity to achieve the necessary degree of atomisation of the fuel. Moreover, the necessary high velocity also results in a significant dispersion of the fuel within the combustion chamber.

It has also been proposed to introduce an ignition enhancing substance with a lean air fuel mixture to assist in the promotion and reproducibility of initial ignition of the lean air/fuel mixture. Hydrogen is typically a preferred enhancing substance to be used in this procedure, but, due to its high rate of dispersion, (approximately 10 times faster than oxygen), relatively large quantities of hydrogen are usually required, particularly where the fuel and hydrogen are introduced into the air charge prior to the delivery thereof to the combustion chamber. Also, as it is desirable for practical reasons to produce the hydrogen within the vehicle rather than merely to supply a reservoir of pre-produced hydrogen, the resulting large consumption of hydrogen necessitates a substantial "on-board" hydrogen generating capacity which consumes energy, occupies space in, and adds weight to, the vehicle.

It is also known that the introduction of other selected substances into the fuel/air charge or mixture in the combustion chamber of an engine can be beneficial to the management of the combustion process. Furthermore, it is also known that the effectiveness of some of these substances is related to the location of the substance within the fuel/air mixture, such as, for example, its location relative to the combustion chamber walls, the fuel entry point to the combustion chamber, the spark plug or like igniter, or the exhaust port. Thus, the ability to supply these substances to the required location within the combustion chamber under normal engine operating conditions can present structural and operational difficulties.

It has also been proposed to provide physical controls to dictate the flow path of the air or air/fuel mixture within the combustion chamber for the purpose of ensuring that a readily ignitable fuel/air mixture is available in the required location relative to the spark plug to promote reliable and reproducible ignition of the air/fuel mixture. The physical controls include pockets or cavities formed in the cylinder head at a location relative to the incoming fuel charge to trap therein a readily ignitable fuel/air mixture. Such pockets or cavities can be in the form of pre-combustion chambers having an igniter device such as a spark plug positioned therein. The effective operation of pre-combustion chambers relies upon the correct readily ignitable fuel/air mixture being established therein, and this can be difficult in an engine wherein the fuel is delivered into the combustion chamber in, or at the same location as, the air charge.

The difficulties may arise from the general lack of quiescence within the combustion chamber due to the tumbling or swirling motion of the air or air/fuel mixture prior to ignition. The movement of combustion gases within the combustion chamber after ignition adds to the difficulty in creating a readily ignitable air/fuel mixture at the spark plug. Further, in the case of pre-combustion chambers, residual gases and contaminants from the previous combustion event within the cylinder cause difficulties as such gases and contaminants are difficult to scavenge or purge from known pre-combustion chambers.

It is the object of the present invention to provide an internal combustion engine having a pre-combustion chamber and a fuel supply system relatively arranged to provide a reliably ignitable fuel/air mixture even at relatively low to medium level fuelling rates.

With this object in view, there is provided an internal combustion engine having a combustion chamber, a pre-combustion chamber communicating with the combustion chamber, injection means located and arranged to periodically deliver controlled amounts of fuel and air into said pre-combustion chamber in a manner and orientation to direct a fuel spray to pass through the pre-combustion chamber into the combustion chamber, and ignition means positioned relative to the pre-combustion chamber and operably arranged to ignite the fuel spray.

Conveniently, the engine is of reciprocating type and further includes a cylinder with the cylinder head and a piston defining the combustion chamber. In this case the pre-combustion chamber is preferably formed in the cylinder head. However, the invention is equally applicable to rotary engines having no cylinders.

Preferably, the injection means is arranged and controlled to deliver a metered quantity of fuel whilst also delivering a quantity of air, not necessarily directly related to the quantity of fuel delivered, each cycle. Conveniently, the period of delivery of air is continued after completion of the delivery of the fuel to assist in the conveying of fuel on a path to pass the ignition means, and may commence prior to, during and/or after the delivery of the fuel.

As an alternative, the pre-combustion chamber may be configured to act as a holding chamber for the ignition means. In this regard, separate fuel and air injectors may deliver directly into the pre-combustion chamber and the control of the timing of the delivery thereof may determine the nature of the fuel spray entering the main combustion chamber.

Preferably, the period of delivery is of a duration and/or timing to purge the pre-combustion chamber such that an ignitable range of air/fuel ratio is established within the vicinity of the ignition means at the time of ignition.

Preferably, the period of delivery is of a duration and/or timing to purge the pre-combustion chamber substantially completely free of fuel and other materials, after each fuel delivery. This purging is in respect of unburnt fuel from the previous cycle, residual combustion gases from the previous combustion event, and the normal air charge for the current cycle which may include recycled or residual exhaust gas.

This purging of the pre-combustion chamber following each fuel delivery serves to create a desirable level of quiescence within the pre-combustion chamber and, in particular, at or adjacent the ignition means. Together with a desired air/fuel ratio at the ignition means—which is typically a lean mixture in the trailing portion of the fuel spray—this purging of the pre-combustion chamber contributes to the creation of a reliable and reproducible condition or environment for ignition. Accordingly, the purging contributes substantially to the effective combustion of the fuel and a resultant reduction in the level of emissions.

Conveniently, the combustion chamber may be placed in communication with the pre-combustion chamber through a gas conduction means extending from the combustion chamber to the vicinity of the ignition means. The gas conduction means may take any desired form but it may be found convenient to employ a narrow bore conduit extending between the combustion chamber and the pre-combustion chamber. Preferably, the conduit provides air to the vicinity of the ignition means.

The gas conduction means may assist in the formation of a leaner air/fuel mixture during the trailing portion of the fuel spray as this is formed, as a rule, as the piston rises in an engine cylinder causing a flow of gas through the gas conduction means toward the ignition means. A consequence is the formation of a leaner air/fuel mixture in the vicinity of the ignition means.

If desired, the gas conduction means may be made selectively communicable between the combustion and pre-combustion chambers by a valve means or like device which only allows gas flow therethrough at desired times during an operating cycle of the engine.

Preferably, the pre-combustion chamber is located in the apex region of a cylinder head cavity of wedge shape forming an upper portion of the combustion chamber. Such a configuration is commonly referred to as a "pent-roofed" combustion chamber and has been used in four valve per cylinder four-stroke cycle engines. However, the invention is equally applicable to other cylinder head designs.

Preferably, the pre-combustion chamber is located substantially centrally of the longitudinal extent of the wedge and is conveniently of a generally circular cross-section with the injection means penetrating the wall thereof in the vicinity of the junction of the wall of the pre-combustion chamber and the wall of the combustion chamber. The injection means may be arranged in the uppermost portion of the pre-combustion chamber such that it is located centrally with respect to the vertical motion of the piston.

Preferably, the pre-combustion chamber is of a configuration having a narrowed portion, duct, or throat of reduced cross-section, providing the communication between the pre-combustion chamber and the normal combustion chamber. The ignition means is conveniently located to establish initial ignition of the fuel within the duct, neck or upstream thereof. Preferably, the ignition means is located centrally in the pre-combustion chamber.

In one form, the pre-combustion chamber is provided by an insert to the cylinder head which communicates with the combustion chamber at one lower end thereof. The insert preferably has a narrow duct or neck at a lower end communicating with the combustion chamber. The upper end of the insert conveniently communicates with the injection means.

Advantageously, the gas conduction means is separate from this narrow duct and may be a passage, conduit, tube or like means also, optionally, forming part of the insert.

The separate nature of the gas conduction means from the narrow duct allows the generation of a circulation of gas, at relatively high flow through the gas conduction means, advantageously of smaller flow area than the flow area of the narrow duct that promotes rapid travel of a flame front through the narrow duct into the body of the combustion chamber.

In an alternative form, the pre-combustion chamber is formed as part of the injection means and advantageously communicates with the combustion chamber via a narrow duct. The narrow duct serves to shield the pre-combustion chamber from the typically turbulent environment within the combustion chamber and further serves to create a narrow penetrating stream of fuel into the combustion chamber.

Conveniently, the engine may operate on a four stroke cycle such that at least one inlet and at least one outlet valve are provided on opposing sides of the pre-combustion chamber within the cylinder head. This arrangement, during operation, serves to shield the ignition means from the air which enters the combustion chamber via the inlet valve and contributes to the creation of a reproducible ignition environment at or adjacent the ignition means. This in turn enables other substances to be introduced to the combustion chamber together with the air and/or air/fuel mixture. Such substances may include substantial levels of exhaust gas desirable for emission control.

There is also provided a method of operation of an internal combustion engine having a combustion chamber, a pre-combustion chamber communicating with the combustion chamber, injection means located and arranged to periodically deliver controlled amounts of fuel and air into said pre-combustion chamber in a manner and orientation to direct a fuel spray to pass through the pre-combustion chamber into the combustion chamber, and ignition means positioned relative to the pre-combustion chamber to ignite the fuel spray, said method comprising controlling the delivery of the fuel and air to the pre-combustion chamber so that said pre-combustion chamber is substantially purged of the pre-existing contents therein, establishing an ignitable fuel-air mixture is in a portion of the fuel spray spaced rearwardly from the leading end thereof.

Preferably, the ignitable fuel-air mixture is established in the trailing portion of the fuel spray.

Conveniently, a flow of gas from the combustion chamber to the pre-combustion chamber may be generated during the trailing portion of the fuel spray. For example, gas may be caused to flow through a gas conduction means extending from the combustion chamber to the vicinity of the ignition means. In such a manner, "leaning out" of the mixture prior to ignition may be assisted with benefit in terms of emission control.

Conveniently, the engine is of reciprocating type having a cylinder head with the cylinder defining, with the piston, the combustion chamber. In this case, the pre-combustion chamber is preferably formed in the cylinder head. However, rotary engines are also comprehended by the method of the invention.

In an alternative form, the pre-combustion chamber is located in the apex region of a wedge shaped cylinder head cavity forming an upper portion of the combustion chamber. Preferably, the pre-combustion chamber is located substantially centrally of the longitudinal extent of the wedge. The pre-combustion chamber is conveniently of a generally circular cross-section with the injection means penetrating the wall thereof in the vicinity of the junction of the wall of the pre-combustion chamber and the wall of the combustion chamber.

The injection means is preferably of a known type whereby a metered quantity of fuel is delivered into a quantity of compressed air, and is carried by the air into the combustion chamber. A typical example of such an injection means is disclosed in the applicant's U. S. Pat. No. 4,934,329 which is hereby incorporated herein by reference. This type of injector or injection means can be operated to adjust the timing of the introduction of the fuel into the compressed air relative to the commencement of the delivery of the compressed air or other gas from the injector. This enables the timing of the delivery of the fuel to the combustion chamber to be varied relative to the commencement of the delivery of the compressed air. This enables the period of fuel or air delivery to be varied in accordance with engine operating conditions in order to obtain the desired purging of the pre-combustion chamber and positioning of the fuel spray relative to the ignition means as required.

In a further alternative form, the injection means may be controlled to perform more than one injection event within a single combustion cycle. For example, the injection means may be controlled such that, upon a first opening of a nozzle valve of the injection means, the fuel and air delivered into the pre-combustion chamber purges it free of any residual gases and substantially all of the fuel therein. Such injection may also enable mixing of fuel and air within the combustion chamber to facilitate formation of a "homogeneous" charge rather than a stratified charge where the former is appropriate. This is primarily achieved by the end portion of the injection event being constituted by air only. Thereafter, a second injection event may occur wherein a small quantity of fuel and/or air is injected into the purged pre-combustion chamber to establish a desired air/fuel ratio in the vicinity of the ignition means. At the time of the second injection event, the pre-combustion chamber is ideally in a quiescent state and a reliable, reproducible ignition environment is created. This is typically achieved by generating a lean ignitable fuel/air mixture at, or in the vicinity of, the ignition means, again being desirably assisted by the additional flow of gas through the gas conduction means from the combustion chamber to the pre-combustion chamber.

The construction and operation of a fuel injector of the type just referred to is disclosed in the applicant's U. S. Pat. No. 4,800,862 which is hereby incorporated herein by reference.

The invention disclosed herein is particularly suitable for application to four stroke cycle internal combustion engines but may also be applied to engines operating on other cycles such as the two stroke cycle.

The invention will be now described with reference to one practical arrangement thereof as illustrated in the accompanying drawings.

Figure 1:
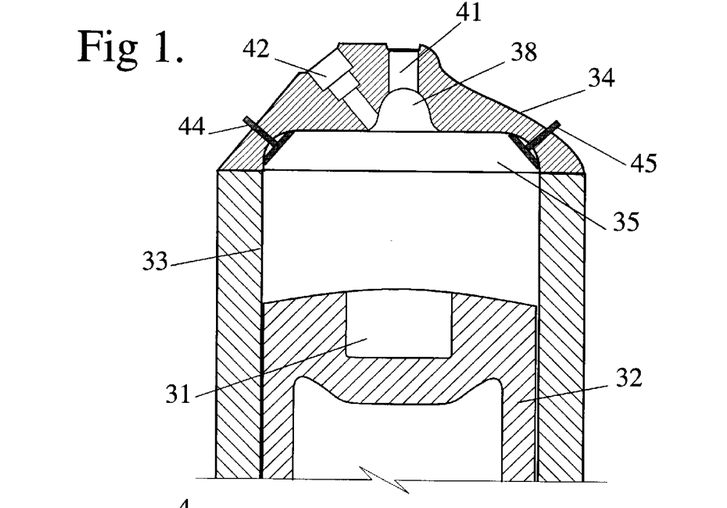
FIG. 1 is a representation in section of a portion of an internal combustion engine illustrating the form of the pre-combustion chamber.

Referring now to FIG. 1 of the drawings, the engine cylinder 33 has a head 34 and a piston 32 incorporating a cavity 31 in the crown thereof. The under face of the cylinder head 34 has a cavity 35 which, with the piston 32 and upper face portion of the cylinder 33, defines the combustion chamber 36. The cavity 35 may be of any desirable configuration, for example, the wedge-shaped or "pent-roofed" combustion chamber arrangement as depicted in, and described with reference to, FIGS. 3 and 4. However, the cavity 35 is not essential to the present invention and may be omitted if desired.

Figure 2:
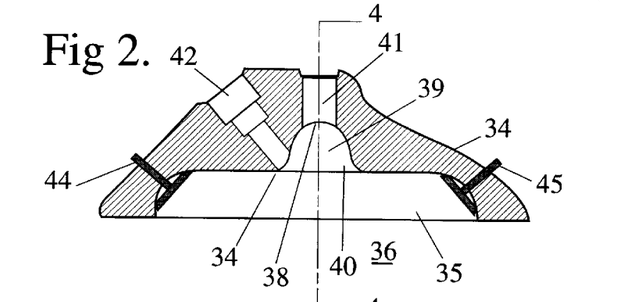
FIG. 2 is an enlarged view of the cylinder head of the engine shown in FIG. 1.

A pre-combustion chamber 38 located within the cylinder head 34 is of a generally circular cross-section having an upper domed section 39 and a lower frusto-conical downwardly diverging portion 40 as is more clearly seen in FIG. 2. Extending upwardly from the domed section 39 is a co-axial bore 41, preferably internally threaded to receive a portion of a two fluid fuel injector of known construction as previously referred to in the applicant's U.S. patent application Ser. No. 4,934,329.

Also, to one side of the cylinder head 34 is a sloped bore 42 configured to threadably receive a conventional spark plug (not shown). The relative arrangement of the bore 41 and spark plug is such that the electrodes between which the spark is created are located in the location immediately upstream of or at the junction 43 of, the combustion chamber 36 and the frusto-conical portion 40 of the pre-combustion chamber 38.

An inlet valve 44 and an outlet or exhaust valve 45 are located within the cylinder head 34 on opposing sides of the pre-combustion chamber 38. The inlet valve 44 is arranged such that it imparts a tumbling action to the air as it enters the combustion chamber 36. Whilst the present embodiment is described in respect of a four stroke cycle engine, it is to be noted that the arrangement as shown in the cylinder head 34, together with the resulting combustion chamber 36 is equally applicable to two stroke cycle engines. Similarly, the invention is not limited to engines in which air is imparted with a tumbling motion and is equally applicable to other engines including those wherein air is input to the combustion chamber with a swirling motion.

In operation, when the inlet valve 44 opens, air enters the combustion chamber 36 with a tumbling action as it is arranged to pass over the uppermost end of the valve 44. An injection means located within the bore 41 is actuated and injects a penetrating narrow fuel spray into the pre-combustion chamber 38. Depending upon the arrangement of the pre-combustion chamber 38, the cavity 35 and the cavity 31 in the piston 32, the penetration and narrowness of the fuel spray may be modified such as to take account of the distance between the cavity 31 and the injection means. This injection event scavenges or purges the pre-combustion chamber 38 of fuel and residual gases from the previous combustion event.

The injection means is a two-fluid injector as described hereinbefore such that once all the fuel has been injected, air only flows from the injector means into the pre-combustion chamber 38. This serves to create a level of quiescence within the pre-combustion chamber 38 and further purge a majority of the fuel from within the pre-combustion chamber 38. A desirable air/fuel ratio is subsequently generated at the spark plug creating a reproducible, ignitable environment. This environment is created at the plug independent of events occurring in the combustion chamber 36. In this respect, a gas conduction means—as described in greater detail in reference to the embodiments of FIGS. 8 and 9—may be included and play an important role by allowing a flow of air or other gases from the combustion chamber 36 to be directed in a controlled manner at the spark plug and assisting in the purging of residual exhaust gas and formation of a lean air/fuel mixture especially at the trailing end of the fuel injection event. This environment is created at the spark plug independent of events occurring in the combustion chamber 36.

As an alternative, formation of the air/fuel mixture within the pre-combustion chamber 38 may be arranged to occur in the compressed gases which enter the pre-combustion chamber 38 after fuel has been purged therefrom but before ignition. The combustion chamber 36 may preferably be designed to facilitate the flow of these compressed gases, which mostly comprise air, into the pre-combustion chamber 38 once the initial purging of fuel and gases therefrom has occurred.

Figure 3:
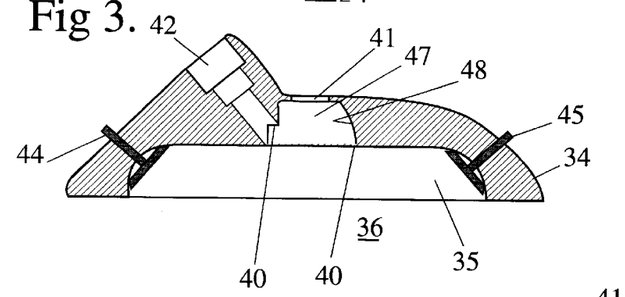
FIG. 3 is a view similar to FIG. 2 of a cylinder head having an alternative shape of combustion chamber and pre-combustion chamber.
Figure 4:
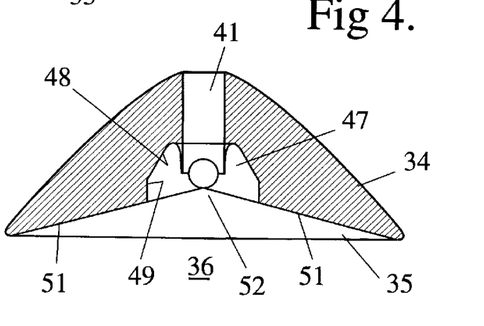
FIG. 4 is a sectional view along line 4—4 in FIG. 2.

Referring now to FIGS. 3 and 4 which depict a modified form of cylinder head which may be used in conjunction with the cylinder 33 and piston 32, as previously referred to in reference to FIGS. 1 and 2, a "pent-roofed" combustion chamber arrangement, as previously mentioned, is shown. For convenience, like parts in FIGS. 3 and 4 are referenced with the same numbers as used in FIGS. 1 and 2.

The pre-combustion chamber 47, shown in FIGS. 3 and 4, is located at the apex of cavity 35 and has an upper portion 48 of generally truncated or conical cross-section, comprising an upwardly extending co-axial bore 41. To receive a portion of a two fluid fuel injector in a similar manner to that described with respect to FIGS. 1 and 2. The lower portion 49 of the pre-combustion chamber 47 is formed substantially coaxial with the upper portion 48. The bore 41 is arranged relative to the shaped bore 42 which is configured to threadably receive a conventional spark plug (not shown) such that the electrodes of the spark plug are located in the location immediately upstream of, or at the junction 50 of, the combustion chamber 36 and the lower portion 49 of the pre-combustion chamber 47.

As shown in FIG. 4, the cavity 35 is defined by two upwardly and oppositely inclined surfaces 51 which meet a line 52 and together define a "pent-roofed" combustion chamber 36 which is commonly used on some four stroke cycle engines.

In each of the constructions of the combustion chamber 36 and pre-combustion chamber 38, 47 described with reference to FIGS. 1 to 4, the disposition of the annular bore 41 to receive the fuel injector and the spark plug bore 42, complement each other and together provide the ability to achieve particularly desirable ignition conditions, particularly with the fuel injector preferably being of the two fluid type which delivers fuel entrained in a gas such as air.

In this regard, the pre-combustion chamber 38, 47 can be purged of combustion residue from a previous cycle before the initiation of the combustion of the new air/fuel mixture. In consequence, and as previously described with reference to FIGS. 1 and 2, the actual ignition of the air/fuel mixture can be controlled, particularly in regard to efficiency of ignition of a part of the fuel spray, which is appropriately delivered relative to the ignition means 63. As previously referred to, use of an injection means 70 where the fuel is delivered entrained in a charge of air, desirably together with flow of gas from the combustion chamber through the gas conduction means 81 to the spark plug may enable the entry of the fuel into the air charge to be controlled to achieve a desired air/fuel ratio in the vicinity of the ignition means or spark plug at the time of occurrence of the spark discharge. This desired air/fuel ratio at, or in the vicinity of, the spark plug together with the favourable environment for ignition created within the pre-combustion chamber 38, 47, due to the quiescence therein, contributes to providing reliable and reproducible ignition events therein through an increased burn rate.

Figure 10:
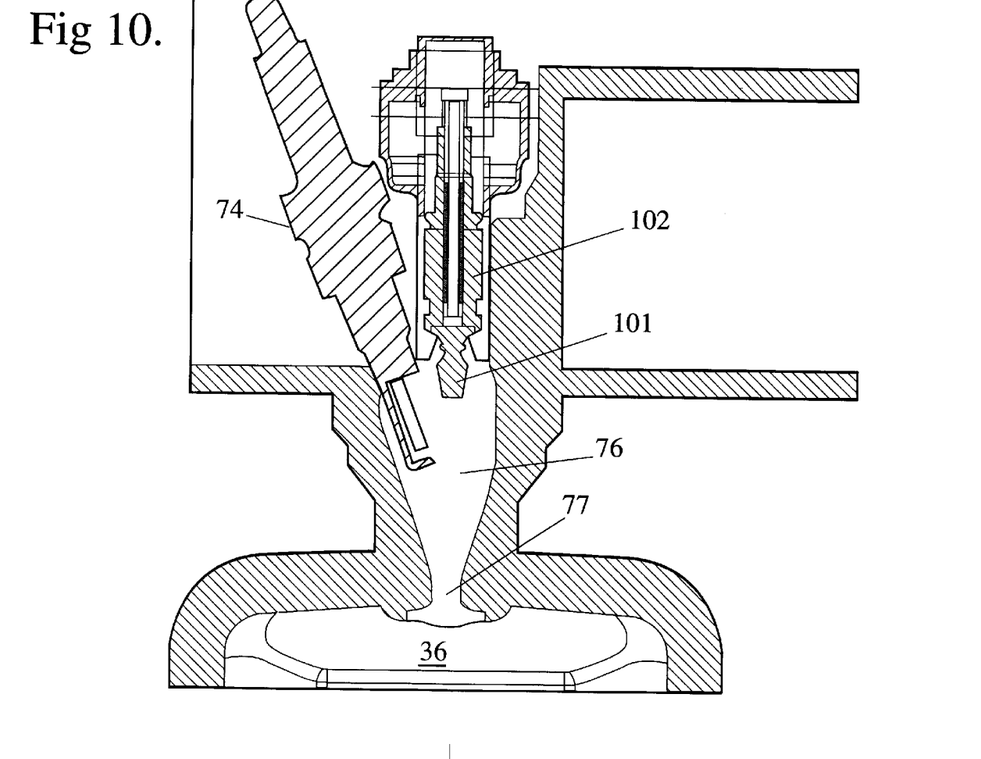
FIG. 10 is a sectional view showing a second alternative form of pre-combustion chamber.

In this regard, it may be appropriate for the pre-combustion chamber to be asymmetric about a longitudinal axis of symmetry of the combustion chamber 36, as shown in FIG. 10. In FIG. 10, the ignition means 74 is enabled to project deeply into the pre-combustion chamber 76 without interfering with delivery of fuel and air from the injector 101 and assisting ignition because the ignition means 74 is located in a zone at which the desirable air/flow ratio for ignition will exist due to the purging flow of cylinder gases into the pre-combustion chamber 76 from combustion chamber 36 as the piston rises.

If desired, a secondary gas conduction means may be communicated between a compressed gas source and the pre-combustion chamber 76 to deliver a flow of compressed gas thereto. The compressed gas source may, without limitation, be a compressed air supply, for example, an air compressor or air compressor circuit. Alternatively, or additionally, the air supply may be that supplying compressed air to the injection means 101, for example an air or air/fuel rail. A conduit may form the secondary gas conduction means and may communicate with the compressed gas source at any desired location. Preferably, the conduit or other form of secondary gas conduction means discharges gas in the vicinity of the ignition means 74 to enable more effective control over air/fuel ratio in this region.

Modifications, as would be apparent to the skilled reader, are deemed within the scope of the present invention. For example, a thin dividing member may be provided to physically isolate the pre-combustion chamber 38, 47 from the cylinder head cavity 35. Such a dividing member may be provided with a small orifice or opening suitably located therein such that communication may only occur between the pre-combustion chamber 38 or 47 and combustion chamber 36 through the orifice. It is envisaged that such a dividing member would further shield the pre-combustion chamber 38 or 47 from the turbulence and other activity within the combustion chamber 36. This may contribute further to achieving a level of quiescence in the pre-combustion chamber 38 or 47.

Figure 5:
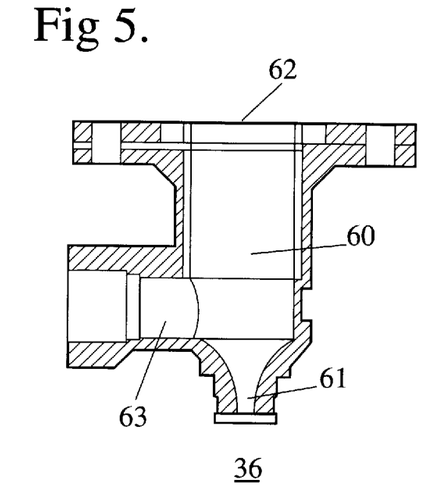
FIG. 5 is a sectional view of a fuel injection device assembled to a cylinder head of an engine having a hollow pre-combustion chamber.

FIG. 5 is a sectional view of an alternative shape of pre-combustion chamber 60 where the delivery passage 61 therefrom is of a restricted flow area to increase the velocity of the fuel/air mixture delivered to the combustion chamber.

Conveniently, the fuel and air delivered from a two fluid injector unit, which may be of the construction disclosed in the applicant's prior U.S. patent, previously referred to herein, enters the pre-combustion chamber 60 at the end 62 and a spark plug is arranged within the passage 63 in the conventional manner. The spark plug is positioned so that it will effectively ignite the fuel/air mixture.

The pre-combustion chamber 60, as described with reference to FIG. 5, may be arranged as an insert to a cylinder head of an engine or may in fact be formed as part of an injection means or as an attachment thereto which communicates with the main combustion chamber of the engine cylinders.

Such an integral unit may then enable retrofitting of the combined injection means and pre-combustion chamber to existing engines. This may be possible using the existing spark plug bore in the cylinder head.

Figure 6:
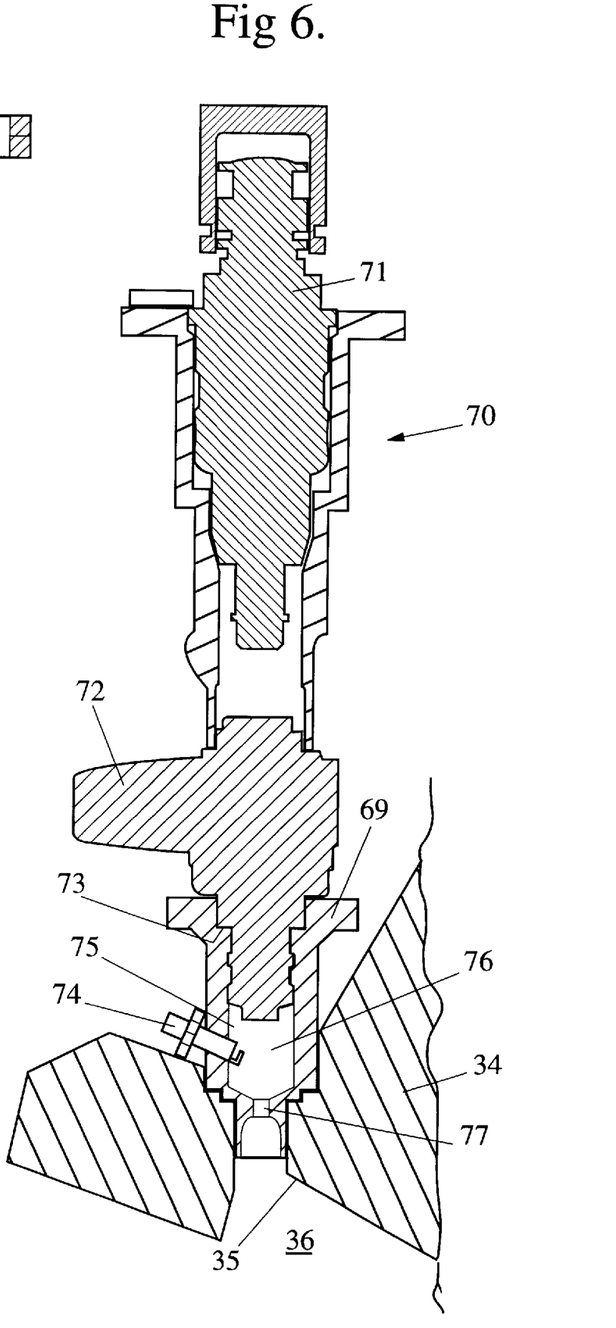
FIG. 6 is a sectional view of an alternative form of pre-combustion chamber that could be used in the fuel injector device shown in FIG. 5.

FIG. 6 shows such an arrangement wherein a pre-combustion chamber insert 69, not unlike that shown in FIG. 5, is arranged within a corresponding bore in the cylinder head 34. An injection means 70 comprising a fuel injector 71 and an air injector 72 is axially arranged within an opening 73 of the pre-combustion chamber insert 69. A spark plug 74 is arranged to communicate with a corresponding threaded bore 75 in the insert 69 such that the electrodes thereof lie within the pre-combustion chamber 76 at a lower end thereof.

The pre-combustion chamber 76 is approximately 0.2–1.0% of the maximum combustion chamber volume and communicates therewith via a narrowed portion, the duct or throat 77. The throat is arranged to provide a contained and penetrating fuel spray into the combustion chamber 36. The throat 77 is narrow to provide increased velocity to the gases exiting the pre-combustion chamber 76. However, the throat 77 cannot be too narrow or the time taken to purge the pre-combustion chamber 76 will be too long and subsequently affect the satisfactory operation of the engine. As an example only, the cross-sectional area of the throat 77 may be approximately 30–50% larger than the nozzle opening (not shown) of the injection means 70 which enables communication with the pre-combustion chamber 76.

Figure 7:
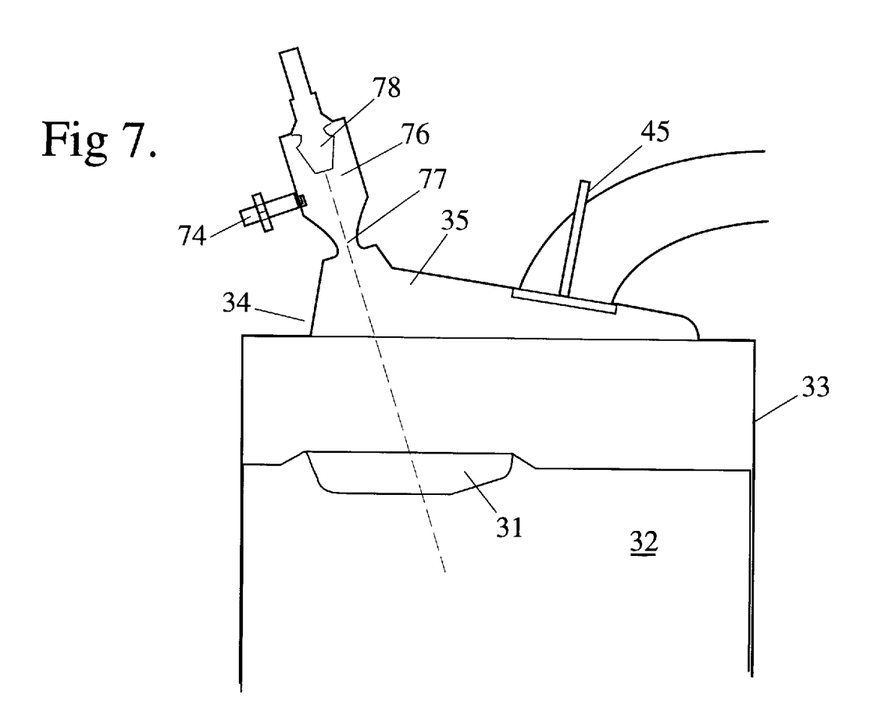
FIG. 7 is a sectional view illustrating the interaction of a stream of fuel with the piston cavity of a piston in a cylinder of an engine incorporating, or operating in accordance with, the present invention.

In operation, when the injection means 70 injects a fuel/air mixture into the pre-combustion chamber 76, the small throat area causes the chamber 76 to fill with fuel and air which substantially scavenges or purges the chamber 76 of any residual gases. This fuel/air mixture is subsequently delivered into the main combustion chamber 36 in the form of a narrow penetrating spray which interacts with the cavity 31 in the piston 32 in a known manner (see FIG. 7). It should be noted that the cavity 31 may be arranged with a specific shape such that it interacts with the fuel spray in the desired manner. In the case of the cavity 31, as shown in FIG. 7, the axis of the pre-combustion chamber 76, and consequently the axis of the fuel/air spray emitted from the throat 77, is coincident with the axis of the cavity 31 at a convenient piston position. For example, as shown in FIG. 7, the two axes are coincident when the piston is at a position corresponding to 55° BTDC.

After the main portion of injection has taken place, air from the air injector 72 only is delivered by the injection means 70. This serves to further purge substantially all of the fuel from the pre-combustion chamber 76 and create a desirable air/fuel ratio at the spark plug electrodes. At this stage the pre-combustion chamber 76 is essentially free of any residual gases and is substantially isolated from the main combustion chamber 36 such that a desirable level of quiescence is created therein. This is a reliable and reproducible environment for ignition. It should be noted that the air fuel ratio at the spark plug electrodes may be controlled to be different to that present in the main combustion chamber 36. This is essentially possible due to the flexibility of the two fluid injection means 70.

In a variant to the above, ignition of the contents of pre-combustion chamber 76 may take place after entry thereto of compressed gases from the combustion chamber 36. Upon substantially all of the fuel being purged from the pre-combustion chamber 76, compressed air from the combustion chamber 36 flows into the pre-combustion chamber 76 as a result of the increase in pressure in combustion chamber 36 caused by the rise of the piston 32 in the cylinder. These gases, being mostly air, serve to further lean out the air/fuel mixture in the pre-combustion chamber 76. Accordingly, it may be desirable to ignite the fuel/air mixture as this air enters the pre-combustion chamber 76 rather than when the final portion of air is delivered by injection means 70. In this connection, the combustion chamber cavity 35 may preferably be arranged to facilitate the flow of combustion gases back into the pre-combustion chamber 76. Such a configuration is shown in FIGS. 6 and 7. For example, the air/fuel mixture in the pre-combustion chamber 76 may be stoichiometric while a large proportion of exhaust gas from an EGR system remains in the combustion chamber 36.

Upon ignition within the pre-combustion chamber 76, a torch of flame is emitted into the combustion chamber 36, through the throat 77, and into the tumbling air within the combustion chamber 36 which results in rapid combustion of the air/fuel mixture therein. Accordingly, as ignition is reliable and reproducible, the ability to mix/use different substances with the air and fuel such as exhaust gas from a suitable EGR system, such as that disclosed in the applicant's corresponding International patent application No. PCT/AU94/00288, is increased. For example, the air/fuel mixture in the chamber 76 may be stoichiometric while a large proportion of exhaust gas from an EGR system remains in the combustion chamber 36.

The nature of the combustion possible is essentially faster than that which may be achieved by way of a conventional spark plug in the combustion chamber arrangement and may admit reduced fuel consumption and $NO_x$ emissions. Further, this construction allows for air/fuel ratios in the main combustion chamber 36 to be as low as 120:1.

The arrangement of the spark plug 74 and injection means 70 to the pre-combustion chamber 76 are not limited to that shown in FIG. 6 and other variants are possible. For example, both the spark plug 74 and the nozzle opening of the injection means 70 may be arranged at the uppermost end of the chamber 76 in a side by side relationship. Alternatively, the spark plug 74 may be replaced by an ignition means which has electrodes arranged within the insert 69 such that a spark occurs across the throat 77 of the pre-combustion chamber 76. Still further, the spark plug 74 or electrodes arranged within the insert 69 may be configured to spark onto the end of the injection means 71 itself or onto a projection 78 of the injection means as seen in FIG. 7. These latter arrangements provide the advantage that the spark will typically traverse a range of air/fuel ratios within the chamber 76 wherein one is highly likely to result in ignition of the air/fuel mixture.

Still further, the fuel and air injectors 71 and 72 may be arranged to separately deliver fuel and air into the pre-combustion chamber 76 via separate orifices. Such orifices could be arranged at the top of the pre-combustion chamber 76 and the timing of delivery of both the fuel and air would determine the resultant air/fuel ratio and nature of the fuel spray to be delivered through the throat 77. Further, a plurality of throats 77, or orifices, may be provided through which fuel may be delivered to the combustion chamber 36.

Figure 11:
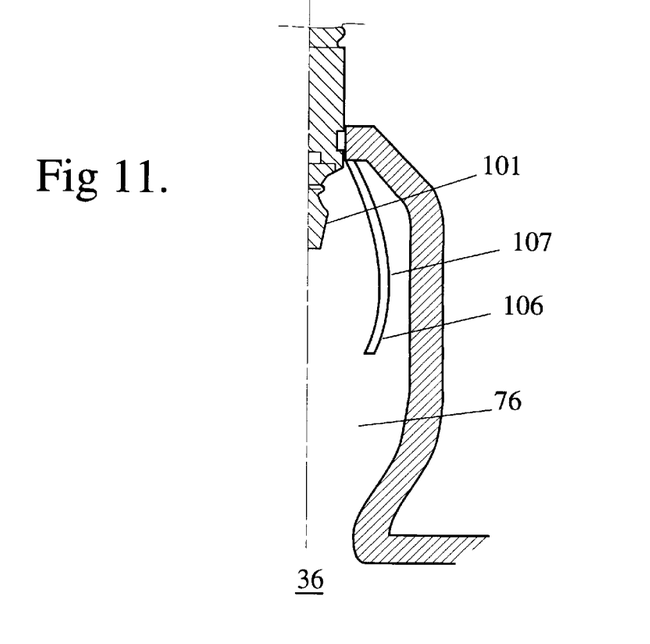
FIG. 11 is a part-sectional view of a third alternative form of pre-combustion chamber.

In a further arrangement, the pre-combustion chamber 76 may be provided with a baffle 106, preferably curvilinear to promote desired spray geometry though a vertical plate could be employed. The baffle 106 acts as a flow guide for the fuel/air mixture delivered from injector 101 and here the ignition means 74 is located between baffle 106 and the inner wall of pre-combustion chamber 76 in a region 107 defined therebetween which is isolated from the fuel spray from injector 101. In such an arrangement, flow of the air/fuel mixture is directed downward toward the narrowed portion or throat 77 and gases in region 107 outward from the baffle 106 remain fuel-lean as the spray from the injector 101 does not reach this region 107.

The "leaning-out" of fuel in gases present in region 107 may further be promoted by bleeding of air or other gases from the compressed air or gas source (not shown), for example as described with reference to FIG. 10, through a secondary gas conduction means into region 107. In this case, as in the case of FIG. 10, the secondary gas conduction means may be a conduit which opens into the pre-combustion chamber through a small aperture formed in the wall of pre-combustion chamber 76. The conduit may connect with the air or gas supply to the engine. If desired, the air or gas supply means may be made selectively communicable, under certain engine operating conditions, with region 107, through a valve, orifice or other flow control means. If a valve is employed, this could be solenoid controlled. Typically, the aperture remains continuously open and is small enough to enable flow of gas into the pre-combustion chamber region 107, preferably in the vicinity of the ignition means to enable more effective control over air/fuel ratio in this region. In addition, bacause the aperture is small, the quantity of combustion gases which may enter the aperture and thus the conduit or other secondary gas conduction means is insubstantial.

The timing of the delivery of the air/fuel mixture by the injector to the pre-combustion chamber of each of the embodiments described, and the activation of the spark plug are typically controlled by an electronic control unit (ECU) as is well known in the engine management field. The ECU is programmed so that the delivery of the air charge to the pre-combustion chamber and the introduction of the fuel to the air charge are timed so that an ignitable mixture is created at the spark plug when the spark is delivered. The timing of the delivery of the spark is preferably such that it does not ignite the leading section of the fuel spray issued during the injection event and preferably ignites the trailing or an outer lean section thereof.

Figure 8:
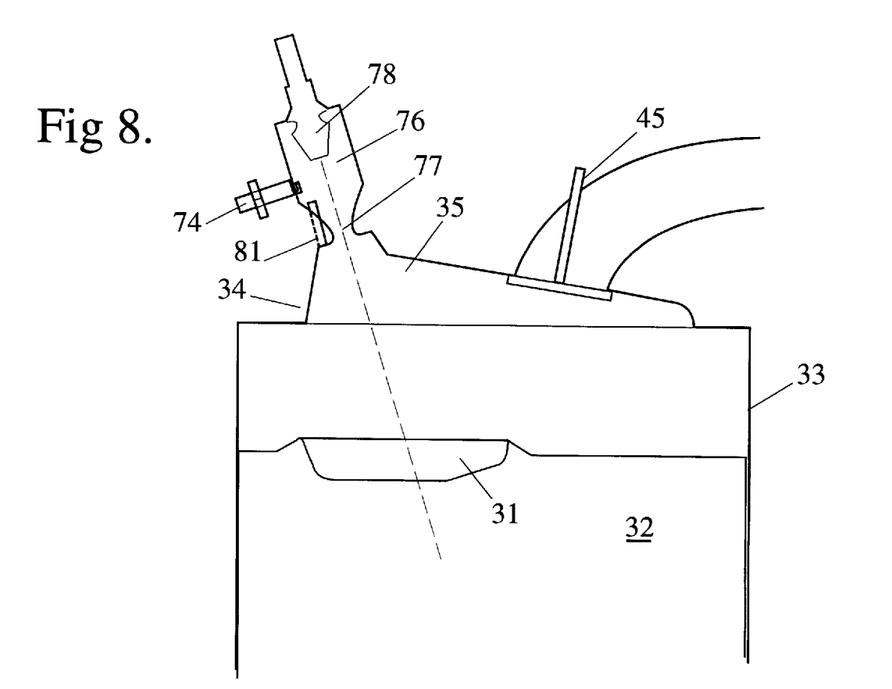
FIG. 8 is a sectional view, similar to FIG. 7, of a further embodiment of the present invention.

Referring now to FIG. 8, this shows an embodiment similar to FIG. 7 described above with the additional feature of a gas conduction means, here taking the form of a conduit 81. The conduit 81 extends from the combustion chamber 36 to the spark plug 74 disposed within the pre-combustion chamber 76. The use of a light metal, a conductive material, allows the formation of a heat transfer path as well as a gas flow path from the combustion chamber 36 to the pre-combustion chamber 76. In the embodiment shown, the conduit 81 also forms part of an insert to the cylinder head of the engine though it could equally be formed separately, for example as part of the cylinder block.

The conduit 81, of substantially constant cross-sectional area, extends approximately parallel to an axis extending vertically through the centre of the combustion chamber 36 and cylinder head and opens approximate to spark plug 74. However, the conduit 81 may be arranged in any desired manner at an any desired trajectory which facilitates manufacture and achieves the objective of delivering gas to the vicinity of spark plug 74 to achieve a desired lean air/fuel mixture thereat in the trailing portion of the fuel injection event.

It is to be particularly noted that the conduit 81 is separate from the throat of the pre-combustion chamber and, advantageously, does not extend therethrough. Thus the throat 77 which serves the important function of direction of fuel spray into the combustion chamber 36 is not obstructed by the conduit 81.

It is to be noted that the cross-sectional area of conduit 81 should be less than that of throat 77 to ensure that a high pressure flow of air is created therethrough in response to rise of a piston within the cylinder of which combustion chamber 36 forms part.

Operation is analogous to that described with respect to FIG. 7 so when the injection means 70 injects the fuel/air mixture into the pre-combustion chamber 76, the chamber 76 fills with fuel and air which substantially scavenges or purges the chamber 76 of any residual gases. To some extent, this may be assisted by vacuum through conduit 81 when the piston descends through the cylinder. After the main portion of injection has taken place, air from the air injector 72 only is delivered by the injection means 70. This serves to further purge substantially all of the fuel from the pre-combustion chamber 76 and helps to create a desirable air/fuel ratio for ignition at the spark plug electrodes. Here the gas conduit 81 may play a most important role. As the piston rises in the cylinder, pressure of gas in the combustion chamber 36 rises and, when this pressure rises above that in pre-combustion chamber 76, a flow of gas through conduit 81 towards the spark plug 74 will commence. The flow rate increases, as does the pressure of the air flow towards the pre-combustion chamber 76, the higher the piston rises in the cylinder. Accordingly, a form of self-regulation is imposed on the air/fuel ratio in the vicinity of the spark plug electrodes. As the fuel injection event proceeds, the piston continues to rise in the cylinder. Accordingly, the air flow through conduit 81 increases and the air/fuel ratio in the vicinity of the spark plug accordingly falls to a level at which ignition may take place. The expansion that follows ignition causes air flow through the throat 77 and a kind of circulation may be established through the pre-combustion chamber 76. At this stage, the pre-combustion chamber 76 is essentially free of any residual gases and is substantially isolated from the main combustion chamber 36 such that a desirable level of quiescence is created therein. This is a reliable and reproducible environment for ignition. It may also be noted that the air/fuel ratio at the spark plug electrodes may be controlled through control of flow through conduit 81 to be different to that present in the main combustion chamber 36. This is essentially possible due to the flexibility of the two fluid injection means 70.

Though it will be observed that, in the embodiment of FIG. 8, the conduit 81 is not provided with valve or like means to control flow of gas between combustion chamber 36 and pre-combustion chamber 76, it will be understood that such control could be employed, if desired. For example, a solenoid valve could be opened to allow gas flow to pre-combustion 76 in response, for example, to sensed engine position. Opening, or a degree of opening, of the valve or like means might also, or alternatively, be controlled in accordance with engine operating conditions. Rather than a solenoid valve, a valve openable in response to pressure in the combustion chamber 36 rising above a predetermined level might be employed instead. In a variant to the above, ignition could follow entry to the pre-combustion chamber 76 of compressed gases from the combustion chamber 36 which have flowed through conduit 81.

Figure 9:
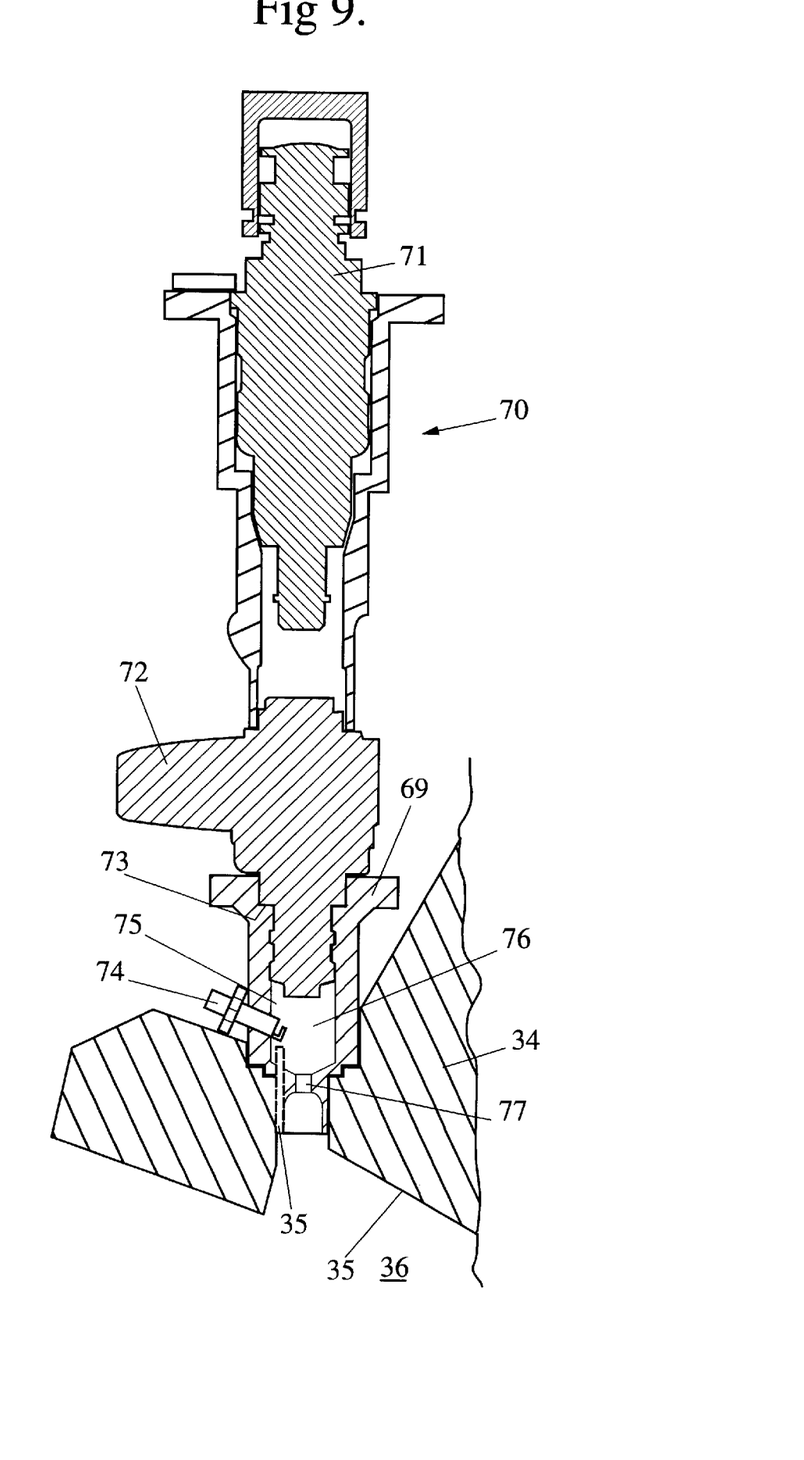
FIG. 9 is a sectional view, similar to FIG. 6, of a further embodiment of the present invention.

FIG. 9 shows a further embodiment similar to that of FIG. 6 but including a gas conduit 81. In this case, the gas conduit 81 may form part of the insert 69. Otherwise the embodiment is the same as that described with respect to FIG. 7. However, it may be noted that the spark plug 74 could be formed integral with gas conduit 81 and, if desired, a plurality of gas conduits 81 could be provided though this may be avoided with benefit of a less complex arrangement.

The pre-combustion chamber configuration and location, and fuel ignition management described herein is particularly applicable to four stroke cycle engines but may also be used in relation to other forms of engines including two stroke cycle engines and rotary engines.

The above description is provided for the purposes of exemplification only and it will be understood by the person skilled in the art that modifications and variations may be made without departing from the invention.

We claim:

1. An internal combustion engine (20) having a combustion chamber (36), a pre-combustion chamber (38) communicating with the combustion chamber (36), injection means (70) located and arranged to periodically deliver controlled amounts of fuel and air into said pre-combustion chamber (38) in a manner and orientation to direct a fuel spray to pass through the pre-combustion chamber (38) into the combustion chamber (36), and ignition means (63) positioned relative to the pre-combustion chamber (38) and operably arranged to ignite the fuel spray.

2. The engine of claim 1 further including a cylinder (33) with the cylinder head and a piston (32) defining the combustion chamber (36) wherein said pre-combustion (38) chamber is formed in said cylinder head (34).

3. The engine of claim 1 wherein said injection means (70) is arranged and controlled to deliver a metered quantity of fuel and a quantity of air to said pre-combustion chamber (38).

4. The engine of claim 1 wherein the combustion chamber (36) and the pre-combustion chamber (38) communicate through a narrowed portion (77) having a smaller cross-section than that of the pre-combustion chamber (38).

5. The engine of claim 4 wherein said narrowed portion (77) is a duct.

6. The engine of claim 1 wherein said pre-combustion chamber (38) is a holding chamber for the ignition means (63).

7. The engine of claim 1 wherein separate air and fuel injectors (71,72) are arranged to deliver directly into the pre-combustion chamber (69).

8. The engine of claim 1 wherein said combustion chamber (36) communicates with the pre-combustion chamber (38) through a gas conduction means (81) extending from the combustion chamber to the vicinity of the ignition means (63).

9. The engine of claim 8 wherein said gas conduction means (81) is a conduit.

10. The engine of claim 8 wherein said gas conduction means (81) is arranged to communicate selectively between said combustion chamber (36) and said pre-combustion chamber (38).

11. The engine of claim 1 including a cylinder head cavity (35) of wedge-shape forming an upper portion of said combustion chamber (36) wherein said pre-combustion chamber (38) is located in an apex region of said cavity (35).

12. The engine of claim 11 wherein said pre-combustion chamber (38) is located substantially centrally of a longitudinal extent of said cavity (35).

13. The engine of claim 1 wherein said pre-combustion chamber (38) is of generally circular cross-section.

14. The engine of claim 2 wherein said injection means (70) is located within said pre-combustion chamber (38) at a position substantially opposite to a said communication between said combustion chamber (36) and said pre-combustion chamber (38).

15. The engine of claim 2 wherein said pre-combustion chamber (38) is provided by an insert (60) to said cylinder head having a lower end communicating with said combustion chamber (36) and an upper end communicating with said injection means (70).

16. The engine of claim 6 wherein said gas conduction means (81) is separate from said duct (77).

17. The engine of claim 1 wherein said pre-combustion chamber (38) is formed as a part of said injection means (70).

18. The engine of claim 1 wherein said injection means (70) penetrates a wall of said pre-combustion chamber (38) in the vicinity of the junction (50) of the wall of the pre-combustion chamber (38) and a wall of the combustion chamber (36).

19. The engine of claim 1 wherein the period of delivery of air is continued after completion of delivery of fuel.

20. The engine of claim 19 wherein delivery of air is commenced prior to delivery of fuel.

21. The engine of claim 19 wherein delivery of air is commenced during delivery of fuel.

22. The engine of claim 19 wherein delivery of air is commenced after delivery of fuel.

23. The engine of claim 1 wherein the period of delivery is of a duration and/or timing to purge the pre-combustion chamber (38).

24. The engine of claim 1 arranged to operate on a four stroke cycle.

25. The engine of claim 24 wherein at least one inlet valve (44) and at least one outlet valve (45) are provided on opposing sides of said pre-combustion chamber (38) within said cylinder head (34).

26. The engine of claim 24 wherein said ignition means (63) is arranged to be shielded from air entering said combustion chamber (36) through an inlet valve (44).

27. The engine of claim 1 arranged for a substance other than air and fuel to be introduced to said pre-combustion chamber (36).

28. The engine of claim 27 wherein the substance includes hydrogen.

29. The engine of claim 27 wherein said substance includes exhaust gas.

30. The engine of claim 2 wherein said injection means (70) is arranged in the uppermost portion of the pre-combustion chamber (38) located centrally with respect to vertical motion of said piston (32).

31. The engine of claim 1 wherein said pre-combustion chamber (38) is physically isolated from said combustion chamber (36).

32. The engine of claim 1 wherein said pre-combustion chamber (38) is approximately 0.2–1.0% of the maximum volume of the combustion chamber (36).

33. The engine of claim 13 wherein cross-sectional area of said duct (77) is approximately 30–50% larger than a nozzle opening of said injection means (70).

34. The engine of claim 13 wherein said pre-combustion chamber (76) includes baffle means (106) defining a region (107) isolated from a spray of fuel from said injection means for facilitating ignition at a desired air/fuel ratio in said region (107).

35. The engine of claim 34 wherein an air or gas supply is arranged to deliver gas to said region (107).

36. The engine of claim 13 wherein said pre-combustion chamber (38) is asymmetric about a longitudinal axis of said combustion chamber (36).

37. The engine of claim 1 wherein a secondary gas conduction means is provided between a compressed gas source and the pre-combustion chamber (38) in the vicinity of the ignition means (63).

38. The engine of claim 37 wherein said compressed gas source is a compressed air source for supplying air to said injection means (70).

39. The engine of claim 37 wherein said secondary gas conduction means is connected to said pre-combustion chamber (38) through a small aperture.

40. The engine of claim 39 wherein said small aperture is continuously open, providing continuous communication between the pre-combustion chamber (38) and the compressed gas source.

41. A method of operation of an internal combustion engine (20) having a combustion chamber (36), a pre-combustion chamber (38) communicating with the combustion chamber (36), injection means (70) located and arranged to periodically deliver controlled amounts of fuel and air into said pre-combustion chamber (38) in a manner and orientation to direct a fuel spray to pass through the pre-combustion chamber (38) into the combustion chamber (36) and ignition means (63) positioned relative to the pre-combustion chamber (38) to ignite the fuel spray, said method comprising controlling the delivery of fuel and air to the pre-combustion chamber (38) to purge pre-existing contents therein, establishing an ignitable fuel-air mixture in a portion of the fuel spray spaced rearwardly from the leading end thereof.

42. The method of claim 41 wherein said ignitable fuel-air mixture is established in the trailing portion of the fuel spray.

43. The method of claim 41 wherein a flow of gas from the combustion chamber (36) to the pre-combustion chamber (38) is generated during the trailing portion of said fuel spray.

44. The method of claim 41 wherein a flow of gas from the combustion chamber (36) is caused to flow through a gas conduction means (81) to the pre-combustion chamber (38) in the vicinity of an ignition means (63) located therein.

45. The method of claim 41 wherein said engine (20) further includes a cylinder (33) with the cylinder head (34) and a piston (32) defining the combustion chamber (36) and said pre-combustion chamber (38) is formed in said cylinder head (34).

46. The method of claim 41 wherein said injection means (70) is arranged and controlled to deliver a metered quantity of fuel and a quantity of air to said pre-combustion chamber (38).

47. The method of claim 41 wherein air and fuel are delivered directly into said pre-combustion chamber (38).

48. The method of claim 41 wherein a substance other than air and fuel is introduced to said pre-combustion chamber (38).

49. The method of claim 48 wherein the substance includes hydrogen.

50. The method of claim 48 wherein said substance includes exhaust gas.

51. The method of claim 41 wherein the period of delivery of air is continued after completion of delivery of fuel.

52. The method of claim 51 wherein delivery of air is commenced prior to delivery of fuel.

53. The method of claim 51 wherein delivery of air is commenced during delivery of fuel.

54. The method of claim 51 wherein delivery of air is commenced after delivery of fuel.

55. The method of claim 41 wherein the period of delivery is of a duration and/or timing to purge the pre-combustion chamber (38).

56. The method of claim 55 wherein the period of delivery is selected to establish a desired range of air/fuel ratio at the ignition means (63) prior to ignition.

57. The method of any claim 41 wherein the period of delivery is varied in accordance with engine operating conditions.

58. The method of claim 41 wherein the injection means (70) is controlled to perform more than one injection event within a single combustion cycle.

59. The method of claim 58 wherein said injection means (70) is controlled such that, upon a first opening of a nozzle valve of said injection means (70), fuel and air is delivered, in a first injection event, into said pre-combustion chamber (38) to purge said chamber of residual gases and fuel.

60. The method of claim 59 wherein purging is followed by a second injection event wherein a quantity of fuel and/or air is injected into the purged pre-combustion chamber (38) to establish a desired air/fuel ratio in the vicinity of an ignition means (63) located therein.

61. The method of claim 59 wherein an end portion of either of said first and second injection events is constituted by air only.

62. The method of claim 41 wherein gas flow in said gas conduction means (81) between said combustion chamber (36) and said pre-combustion chamber (38) is selectively controlled.

63. The method of claim 41 wherein said engine includes a wedge shaped cylinder head cavity (35) forming an upper portion of said combustion chamber (36) and said pre-combustion chamber (38) is located in an apex region of said cavity (35).

64. The method of claim 63 wherein said pre-combustion chamber (38) is located substantially centrally of a longitudinal extent of said cavity (35).

65. The method of claim 41 wherein said engine (20) is operated on a four stroke cycle.

66. The method of claim 41 wherein initial ignition of fuel is established in a duct communicating said combustion chamber (36) with said pre-combustion chamber (38).

67. The method of claim 41 wherein said pre-combustion chamber (38) is provided by an insert (60) to said cylinder head having a lower end communicating with said combustion chamber (36) and an upper end communicating with said injection means (70).

68. The method of claim 41 wherein said gas conduction means (81) is separate from said duct (77).

69. The method of claim 41 wherein said pre-combustion chamber (38) is formed as part of said injection means (70).

70. The method of claim 41 wherein said injection means (70) penetrates a wall of said pre-combustion chamber (38) in the vicinity of the junction (50) of the wall of the pre-combustion chamber (38) and a wall of the combustion chamber (36).

71. The method of claim 41 wherein an air/fuel mixture is ignited in a region (107) of a pre-combustion chamber (38) separated by a baffle (106) from a portion of said pre-combustion chamber to which fuel is delivered by said injection means (70).

72. The method of claim 71 wherein air or gas is supplied to said region (107).

73. The method of claim 41 wherein said ignition means (70) is located in a pre-combustion chamber (38) arranged asymmetrically about a longitudinal axis of said pre-combustion chamber (38) in a portion having desired air/fuel ratio for ignition due to purging gas flow.

* * * * *